United States Patent [19]

Abrams et al.

[11] Patent Number: 4,751,645

[45] Date of Patent: Jun. 14, 1988

[54] METHOD FOR SONIC ANALYSIS OF AN ANOMALY IN A SEAFLOOR TOPOGRAPHIC REPRESENTATION

[76] Inventors: William R. Abrams, R.F.D. 1, Box 116, Wamphussuc Rd.; John Spruance, 4 Pearl St., both of Stonington, Conn. 06378

[21] Appl. No.: 896,132

[22] Filed: Aug. 12, 1986

[51] Int. Cl.[4] .......................... G01S 15/89; G01S 7/60
[52] U.S. Cl. ...................................... 364/420; 367/88
[58] Field of Search .............. 364/420, 421, 518, 521, 364/190; 340/709, 710; 367/88, 107, 115

[56] References Cited

U.S. PATENT DOCUMENTS

| | | | |
|---|---|---|---|
| 4,063,212 | 12/1977 | Sublett | 367/88 |
| 4,096,484 | 6/1978 | Ferre et al. | 367/115 X |
| 4,207,620 | 6/1980 | Morgera | 367/88 |
| 4,313,184 | 1/1982 | Jarman et al. | 367/88 |
| 4,400,803 | 8/1983 | Spiess et al. | 367/88 |
| 4,422,166 | 12/1983 | Klein | 367/115 |
| 4,445,186 | 4/1984 | Caron et al. | 364/521 |
| 4,583,181 | 4/1986 | Gerber et al. | 364/470 |
| 4,685,068 | 8/1987 | Greco, II et al. | 364/518 |

FOREIGN PATENT DOCUMENTS 0227184 11/1985 Japan .
0003080 1/1986 Japan .

OTHER PUBLICATIONS

Clifford, P., "Real Time Seafloor Mapping", *Sea Technology*, vol. 20, No. 5, May 1979, 22–24, 26.
Walker, C. D. T., "Development of a Ground Speed Corrected Side Scan Sonar Display System", *Ultrasonics*, vol. 16, No. 3, May 1978, 108–10.

*Primary Examiner*—Charles E. Atkinson
*Assistant Examiner*—Clark A. Jablon
*Attorney, Agent, or Firm*—McCormick, Paulding & Huber

[57] ABSTRACT

A method for sonic analyzation on-line and in real time or off-line in post processing of a topographic representation of a seafloor to provide the latitude and longitude of an object producing a corresponding anomaly appearance identified in a topographic respresentation generated from a side scan sonar tow fish includes in the on-line, real time analyzation the steps of sequentially touching the tip of a sonic digitizer stylus to a point on the line representation of the seafloor laterally opposite the appearance of the anomaly; to the leading edge and the trailing edge of the anomaly and to the tip of an acoustic shadow of the anomaly appearance; and, if length is desired, to the top and bottom edges of the anomaly appearance. A computer includes a set of instructions to calculate the desired information and is coupled to a host computer associated with a vessel which tows the sonar tow fish along a course covering an area of interest of the seafloor. The computer receives the position, speed and heading of the tow fish at each point contacted by the stylus tip and calculates the latitude and longitude, height, length and width of the corresponding object. In the off-line post processing mode the stylus tip is touched to a calibration point prior to the anomaly analysis and to a fix mark immediately before and after an identified anomaly and inputting the latitude and longitude associated with the respective fix marks. The remaining steps in the post processing mode are similar to the on-line, real time analysis.

11 Claims, 5 Drawing Sheets

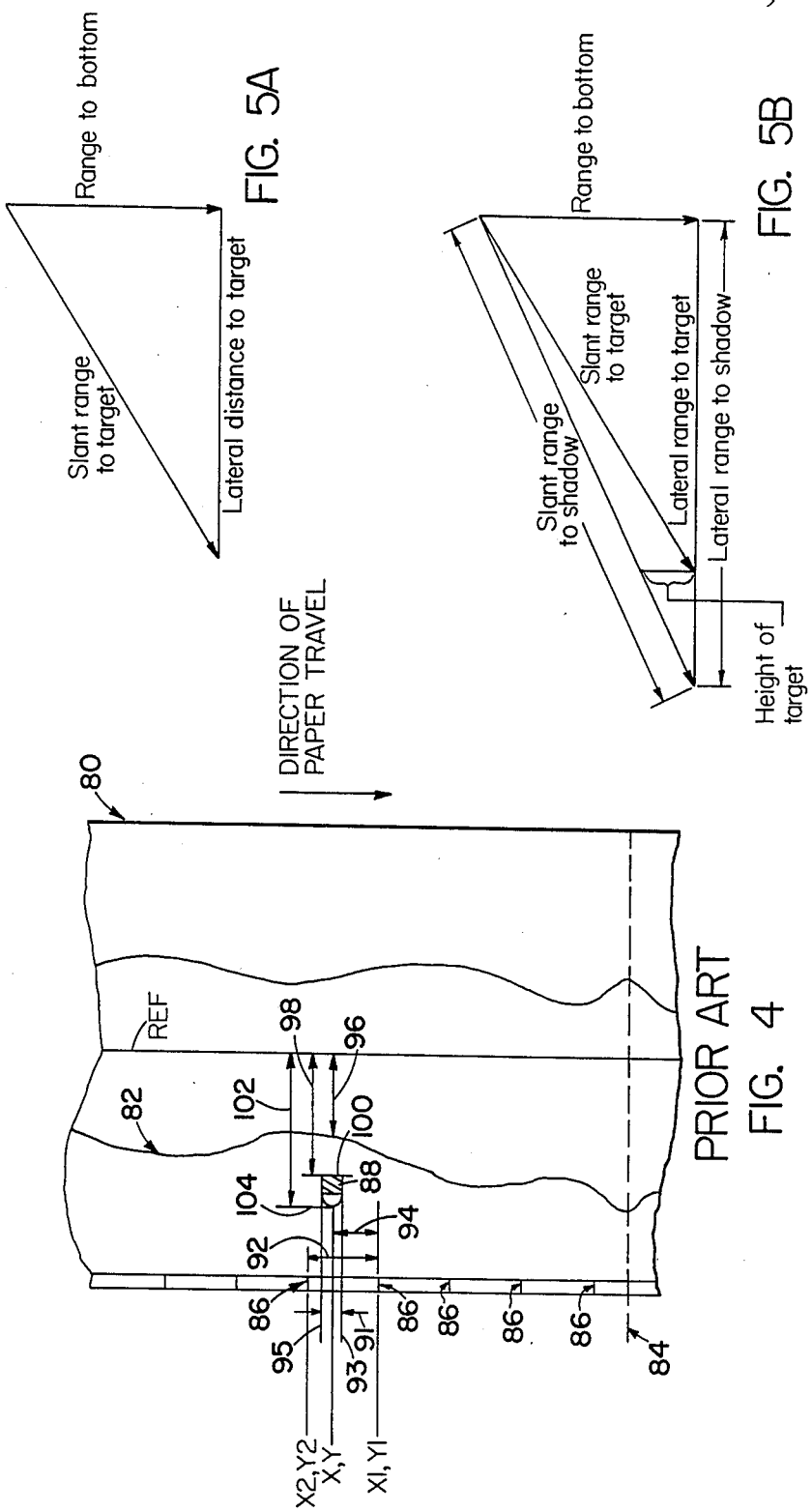

4,751,645

METHOD FOR SONIC ANALYSIS OF AN ANOMALY IN A SEAFLOOR TOPOGRAPHIC REPRESENTATION

BACKGROUND OF THE INVENTION

The present invention relates generally to seafloor topography anomaly analysis and deals more specifically with a computerized sonic method for analyzing in real time or in post processing an anomaly in a seafloor topography mapped by a side scan sonar system.

The analyzation of a topographic representation of a seafloor bottom to identify and locate anomalies or targets on the seafloor is generally a tedious and time consuming task. Although techniques for mapping the topographic features of a seafloor in real time using side scan or side looking sonar equipment, also referred to as a side scan sonar tow fish, is generally well known and understood by those skilled in the art, no apparatus or method is currently available to my knowledge that easily and quickly provides the latitude and longitude or the length, width and height of an identified target as the seafloor is being mapped.

The data required in an anomaly analysis is generally obtained from a topographical representation of the seafloor using manual measuring techniques wherein rulers, ten point dividers, Gerber scales and other manually operated measuring implements are employed to measure relative distances from a reference point printed on the representation. Consequently, the anomaly analysis is routinely performed at a location remote from the actual sonar scanning location and often occurs several days after an area of interest has been mapped. Furthermore, the manual measurement procedure and computation of the relative location of an identified target is often very inaccurate and subsequent attempts to observe and/or retrieve the object associated with an identified anomaly at the computed latitude and longitude can be very time consuming.

One drawback sometimes associated with known anomaly analyses methods is that occasionally it is found during the post processing analyzation process that an area of interest is not adequately mapped and the tow vessel and equipment is required to return to the area at a later time to gather additional information or to remap the seafloor to better identify the suspected anomaly. Sometimes the additional mapping is necessary to help verify or determine among other things, whether a previously identified anomaly represents an object of interest, such as, for example, a sunken ship, lost cargo, etc. or whether the anomaly is merely representative of an irregularity in the seafloor or some other unidentified acoustic interference, such as a school of fish, recorded on the topographic representation as an anomaly.

Another drawback associated with the inability to perform an anomaly analysis in real time is the tow vessel and side scan sonar equipment often remain idle during the period of anomaly analysis. Such vessel and equipment idle periods are costly since a crew is generally required to be on standby in case the vessel is required to return to the location of an identified anomaly for further analysis. Also, seafloor mapping is suspended during these idle periods thus substantially reducing the seafloor area that can be mapped during a given time period.

It would be desirable therefore to have a method for performing a seafloor topographic anomaly analysis substantially simultaneously with the production of the seafloor topographic representation in order to provide the latitude and longitude and if desired, the length, width and height of an identified anomaly as a tow vessel and side scan sonar tow fish move relative to the anomaly.

It would also be desirable to provide a side scan sonar anomaly analysis method wherein a seafloor topographic representation is presented on a conventional strip chart recorder paper or a video display and the coordinates associated with the location of an appearance of an anomaly on such a paper or display are produced using conventional digitizers and methods.

The object of the present invention is therefore, to provide a method for analyzing an anomaly in a seafloor topographic representation which overcomes the aforementioned problems associated with manual measurement methods of anomaly analysis.

It is a further object of the present invention to provide a method for analyzing in real time and on-line an anomaly in a seafloor topographic representation wherein the topographic representation is produced using conventional side scan sonar sensing and recording apparatus and techniques wherein the coordinates of an appearance of an anomaly in the topographic representation is digitized using a sonic digitizer and the coordinates representative of the anomaly location are automatically conditioned to compensate for the relative movement of the tow vessel and the side scan sonar tow fish with respect to a starting reference latitude and longitude.

Another object of the invention is to provide a method for analyzing in real time and on-line an anomaly in a seafloor topographic representation wherein relative changes in the speed and course made good of the tow fish during any given time interval during which an appearance of an anomaly occurs in the representation are automatically taken into account in the determination of the latitude and longtitude of the identified anomaly.

Yet another object of the invention is to provide a method for analyzing offline in post processing an anomaly in a seafloor topographic representation wherein the latitude and longitude position of the tow fish before and after the recorded anomaly appearance are manually inputted and correlated to the position of the side scan sonar tow fish at each position of interest in the seafloor topographic representation along the course of the tow fish.

SUMMARY OF THE INVENTION

In accordance with the present invention a method for sonic analyzation of a topographic representation of a seafloor to provide the latitude and longitude and if desired, the length, width and height of an object producing a corresponding anomaly identified in the topographic representation is presented. A visual representation of a seafloor topography for an area of interest is generated by towing a side scan sonar tow fish near the seafloor along a desired course and recording on a strip chart recorder paper return echos of acoustic signals transmitted from the tow fish.

In one embodiment, the method of the present invention is used for real time, on-line anomaly analysis wherein the appearance of an anomaly is identified and its location is digitized using a sonic digitizer having a stylus with a sound emitting tip. Two point sensors associated with the digitizer are spaced apart and are located in the region of a predetermined reference measuring position associated with the chart recorder and generally at the location of the recorder writing means. A computer used with the present method is programmed with an instruction set to compute the latitude and longitude of an associated given position on the topographic representation and is coupled to a host computer associated with the tow vessel. Position reference signals gathered by the host computer are inputted to the programmed computer for each point on the topographic representation substantially a the time the point is contacted with the tip of the sonic digitizer stylus. The relative rectangular coordinate position of the sonically digitized anomaly appearance is calculated with respect to the predetermined reference measuring position by time and space shifting the digitized coordinate position of the anomaly to the predetermined reference measuring position. The latitude and longitude and the height, width and length of an object producing the corresponding anomaly appearance is computed in accordance with the instruction set.

The method of the present invention in a post processing embodiment includes touching the tip of the sonic digitizer stylus to a predetermined reference measuring position near the point sensors associated with the sonic digitizer and to a zero reference line associated with the topographic representation. The stylus tip is then touched to a fix mark occurring immediately before and immediately after an identified anomaly and the latitude and longitude associated with each respective fix mark is inputted to the programmed computer. The stylus tip is also touched to the base and top of the anomaly appearance and to the tip of an acoustic shadow associated with the anomaly. Each of the respective contact points are converted to rectangular coordinate information for use by the programmed computer to compute the latitude and longitude of the object and if desired, the height, width and length of the object producing the corresponding anomaly appearance.

BRIEF DESCRIPTION OF THE DRAWINGS

Other objects, features and advantages of the present invention will become readily apparent from the following written description taken in conjunction with the drawings wherein:

FIG. 4 is a topographic representation of a seafloor recorded on a portion of a strip chart recorder paper illustrating the various distance measurements that are manually taken in a prior art anomaly analyzation method.

FIG. 5a shows a vector representation of a slant range-to-target, range-to-bottom and lateral range-to-target used in determining the latitude and longitude of the object producing the anomaly.

FIG. 5b shows the vector representation of a slant range-to-shadow and lateral range-to-shadow with the vector representation of FIG. 5a superimposed to illustrate the vector representation used in determining the heigth of the object producing the anomaly.

DETAILED DESCRIPTION OF THE PREFERRED EMBODIMENTS

For a full appreciation of the method of the present invention for analyzing in real time or in post processing an anomaly appearance in a seafloor topographic representation, a brief explanation of the basic concepts of a side scan sonar system is presented. It will be understood that other techniques may be used to distinguish topographic features of the seafloor however, the side scan sonar system is generally preferable.

A side scan sonar system generally employs an acoustic beam whose main axis is slightly below horizontal and the beam is very narrow in the horizontal plane yet sufficiently broad in the vertical plane to obtain echos from a point on the seafloor directly below an acoustic transducer associated with the sonar system to a point a large distance away from the transducer. The combination of the beam shape and the short length of the acoustic pulses transmitted gives side scan sonar type systems the capabilities to resolve small topographic irregularities and small objects on o above the seafloor. As the transducer is towed at an appropriate depth behind a tow vessel, the reflected echos are graphically recorded to present a topographic representation of the seafloor. Generally, the echos are recorded on a strip chart recorder or other display apparatus.

Figure 1:
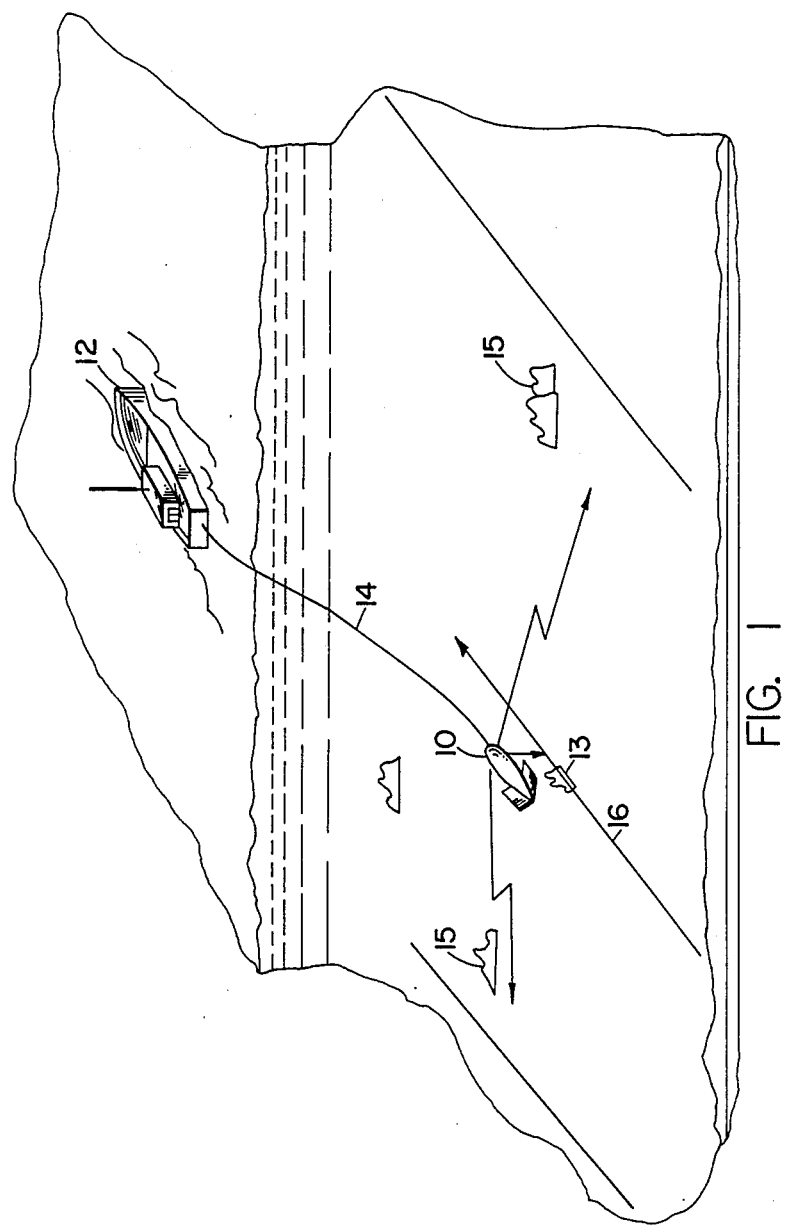
FIG. 1 is a schematic representation of a side scan sonar fish tethered to a tow vessel showing the fish being towed beneath the surface of the sea.
Figure 2:
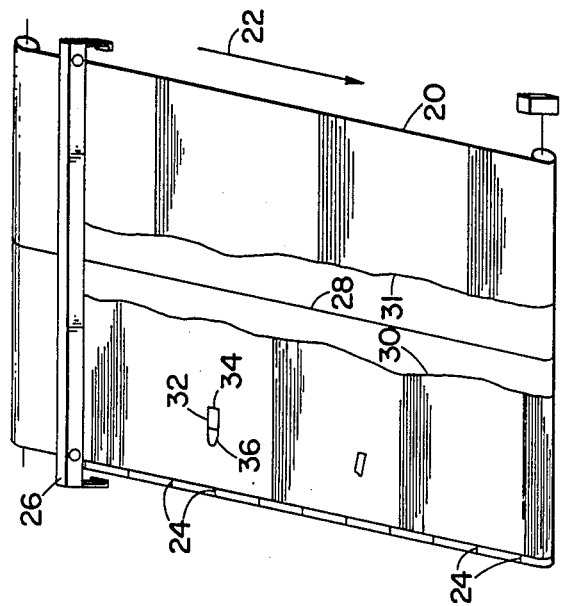
FIG. 2 is a schematic representation of a seafloor topography recorded on a section of a strip chart recording paper wherein the representation includes a schematic illustration of a recorded anomaly or target.

Referring now to FIGS. 1 and 2, acoustic transducers are located on the starboard and port sides respectively of an underwater transducer 10 commonly referred to a "fish" or "tow fish" and each transducer generates a beam pattern which is sufficiently narrow in the horizontal plane to resolve relatively small features in the beam path, yet sufficiently broad in the vertical plane to cover points from approximately beneath the tow fish to points relatively large distance to one respective side. The tow fish 10 is towed behind a vessel 12 by a tether 14 which physically and electrically connects the vessel to the tow fish. The acoustic waves propagating from the tow fish 10 reflect off the seafloor and objects on the seafloor and are returned to the tow fish 10 where the reflected acoustic signals are converted to electrical signals. Since the tow fish 10 is closer to the seafloor at points directly beneath the tow fish rather than at points lateral of the tow fish, the earliest acoustic signals that are received correspond to signals reflected from an object 13 on the seafloor or the seafloor itself directly beneath the tow fish while later received acoustic signals correspond to signals reflected from objects 15,15 on the seafloor lateral of the tow fish. The electrical signals are amplified and their representation recorded by a strip chart recorder on recording paper or displayed on a display device generally located in the tow vessel.

The electrical signals representative of the reflected acoustic signals generally, in the case of a chart recorder, drive a writing stylus which moves transversely across a strip of paper 20 so that the transverse positions of markings on the paper indicate the round trip transmit time of the acoustic wave from the tow fish 10 to the seafloor. The strip of paper 20 generally advances in a longitudinal direction indicated by arrow 22 at a constant or known rate and in contrast to the method of the present invention, the speed of the tow vessel 12 is assumed to be held relatively constant so that the distance between adjacent fix marks 24,24 on the paper 20 correlates linearly to a distance travelled by the tow fish to permit interpolation of distances between adjacent fix marks and between a reference starting position and a position along the recording, typically the position corresponding to the appearance of an anomaly.

The chart recorder may be of any well known type and typically is of the type having a longitudinally elongated strip of conventional electrosensitive paper which darkens in response to current flowing through the paper. The strip of paper is advanced at a fixed known rate from top to bottom in the direction of arrow 22 so that the longitudinal axis of the paper 20 represents a time axis. The marks corresponding to return echos are placed on the paper by a transverse writing assembly 26 and the operation of the writing assembly is generally well known to those skilled in the art.

The illustrated topographic representation shown in FIG. 2 is produced by one type of a side scan sonar system wherein return echos are recorded from both the starboard and the port sides of the tow fish. The reference point representative of the path of the tow fish is along the longitudinal center line 28 of the paper 20. The starboard return echos are plotted from center to right and the port return echos are plotted from center to left. Since a tow fish is towed within 10 to 15 meters of the seafloor for search operations, the recordation of the return echos on the chart paper representative of the relative distance between the seafloor and the tow fish directly beneath the tow fish is shown generally by the aligned lines 30 and 31. Reflections from the seafloor are represented by the shaded areas between the lines 30 and 31 and the respective longitudinal edges of the chart paper 20. An anomaly or target 32 is indicated by the lighter shaded area 32. The base of the target 32 is indicated at 34 and the extent of the shadow of the target is indicated at 36. The size of the shadow is related to the height of an object producing the anomaly and is described below.

Figure 3:
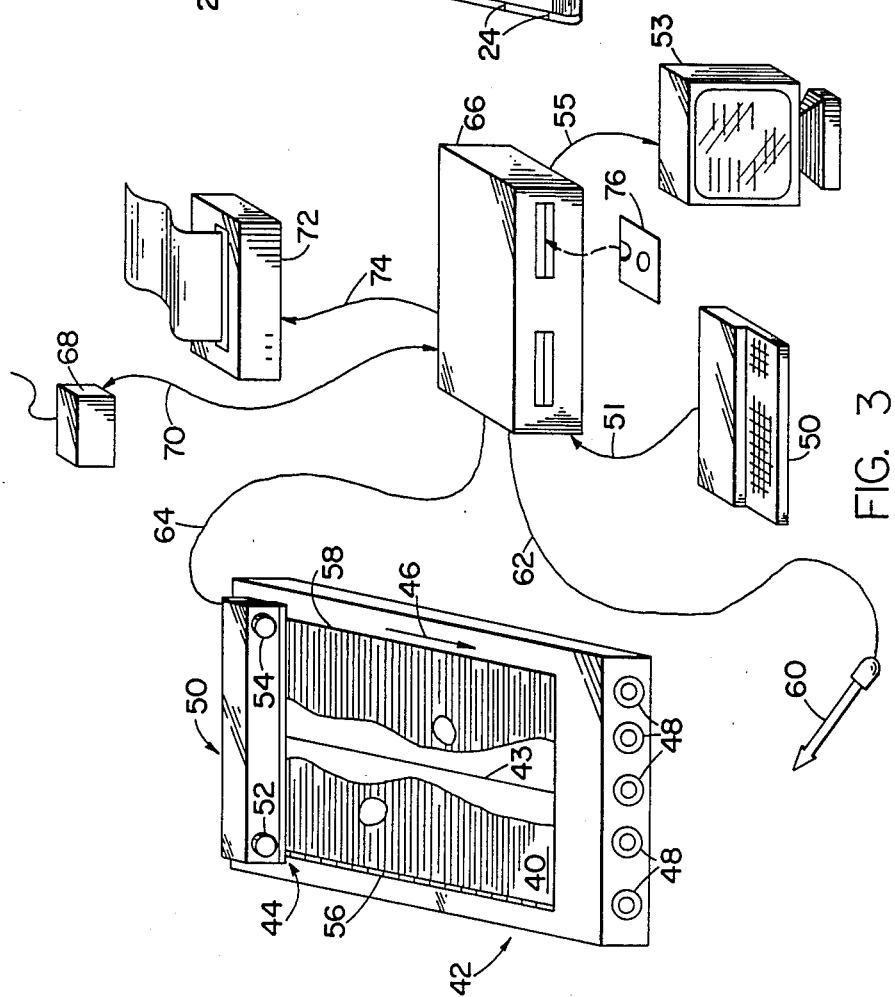
FIG. 3 is a schematic diagram of a helical strip chart recorder equipped with a sonic digitizer and stylus wherein output electrical signals from the digitizer are inputted to a computer together with electrical signals representative of the position, speed and heading of the tow fish from a host computer associated with the tow vessel. The latitude and longitude defining the location of an identified anomaly and other analysis information are outputted to a printer coupled to the host computer.

Referring now to FIG. 3, a perspective somewhat schematic diagram representative of equipment that may be employed to practice the method of the present invention is illustrated. The topography of an area of interest on a seafloor is recorded on the surface of chart paper 40 by a strip chart recorder 42. The recorder 42 may be any one of a number of different type recorders well known to those skilled in the art and may be, for example, a helical type recorder having a transverse writing stylus mechanism 44 for recording the return echos on the chart paper 40 which moves in a longitudinal direction indicated by arrow 46. A number of control knobs 48,48 are used to adjust the speed of the chart paper, calibrate the travel distance of the stylus for a given magnitude electrical signal applied to the recorder input, and other recording functions which are well known to those skilled in the art.

Two point type microphone sensors 52,54 comprising a sonic digitizer are mounted on the chart recorder 42 transversely to the direction of movement of the chart paper 40 and in the region of the stylus writing mechanism 44. The sonic digitizer also includes a sound emitting stylus 60 coupled to a controller or general purpose computer 66 by a conductor 62. The controller 66 includes the associated sonic digitizer electronic circuit components for receiving signals from the microphones and stylus as described below. The microphone 52 is in substantial alignment with one margin 56 of the chart paper 40 and the other microphone 54 is in substantial alignment with the other margin 5B of the chart paper 40. The sonic digitizer employed with the method of the present invention is of the type generally well known and understood by those skilled in the art.

When the tip of the digitizer stylus 60 is touched to the surface of the chart recording paper 40, a sound is emitted from the stylus and is sensed by the microphones 52,54. Because the speed of sound is known, the coordinates at the point of surface contact can be determined with respect to a chosen origin on the surface. For example, since the distance between microphones 52 and 54 is fixed, the origin of a cartesian coordinate system can abritrarily be chosen to be at the intersection point of the microphone 52 and the side margin 56 of the chart paper 40. Since the distance between microphones 52 and 54 is known, the distance between the point of the sound emission and microphone 52 and the distance between the point of the sound emission and microphone 54 is determined by measuring the time it takes for the sound to travel from the stylus to the microphone and multiplying the measured time by the speed of sound. In this manner, the three sides of a triangle are determined and the X,Y coordinate at the surface contact point is computed using well known trigonometric formulas. Each of the coordinates located across the surface are representative of a data point in a data space comprising the plane of the recording paper surface.

Electrical signals representative of the slant range distance from the tow fish 10 to a target and represented by a data point on the chart paper 40 taken with respect to a reference 43 and indicated by the center longitudinal line along the chart paper are outputted from the microphone 52 and 54 of the sonic digitizer to the controller 66 via a conductor 64.

The controller 66 is also coupled by a electrical conduit 70 to a host computer 68 associated with the tow vessel to receive information related to the speed, heading, and position of the tow fish and which information is used in the method of the present invention. The host computer 68 interfaces with various positioning equipment and systems for determining the tow vessel's position and such positioning systems are generally well known to those skilled in the art.

The controller 66 is also coupled to a printer 72 by an electrical conduit 74 and the printer 72 receives and prints the information analyzed and computed by the controller 66 such as, for example the computed latitude and longitude, height, and other information describing an object producing a corresponding anomaly appearance identified on the chart recorder paper 40. The method of the present invention is carried out in accordance with an instruction set contained, for example, on a recording medium 76 such as a floppy disk that is readable by the controller 66 and enables the controller to perform the real time and post processing analysis of an identified anomaly. The instruction set may also reside in a memory device in the controller 66.

Still referring to FIG. 3, the equipment arrangement shown includes a keyboard 50 coupled to the controller 66 by an electrical conduit 51 for entering commands, data and other information related to the system operation into the controller.

A display, such as, a cathode ray tube or other video device 53 is coupled to the controller 66 via an electrical conduit 55 and acts as an operator prompt by displaying messages and instructions to the operator. The video device 53 also displays information associated with data produced by the side scan sonar system and information analyzed by the controller 66 describing an object producing the anomaly appearance and its location.

A brief discussion of one prior art method of analyzing the appearance of an anomaly in the topographic representation of a seafloor is discussed below to provide a better appreciation of the method of the present invention. Referring to FIG. 4, a portion of a recording is shown on a chart paper 80 wherein the topography of a seafloor is recorded for example, with a side scan sonar system. The seafloor is indicated generally by the line 82 and represents the first return echos from beneath the tow fish. The paper 80 may contain a reference mark 84 representative of the latitude and longitude at the beginning of a mapped area or start of a course traversed by a tow fish. Fix marks 86,86 are located at spaced intervals along one margin of the paper and each are representative of a latitude and longitude along the course of the tow fish facilitate measuring lengths between the immediately adjacent fix marks and the anomaly appearance as discussed below.

The latitude and longitude of an anomaly 88 located between two adjacent fix marks 86,86 is determined by measuring the length 92 between the fix marks closest to the anomaly 88. The two fix marks of interest are identified as X1,Y1 and X2,Y2 respectively along the tow fish course. Since the speed of the chart paper is known and it is assumed that the tow vessel is moving with a constant speed along a fixed heading, a scale correlating a longitudinal length measurement along the chart paper to the distance that a tow vessel travels in a given time is established. For example, a one inch measurement along the chart paper may be equal to fifty meters for a given tow vessel's speed. It will be understood that the scale units may be other than the illustrative units. Therefore, the distance between the fix marks is determined by subtracting X1,Y1 from X2,Y2. In order to determine the location of the tow fish between the two fix marks, ten point dividers are used to establish a percentage of the distance that the tow fish is between the two fix marks. Since the distance between the two fix marks can be determined, the proportionate distance 94 between the tow fish at the target point and the fix mark X1,Y1 is added to the fix mark X1,Y1 to determine the position X,Y of the tow fish at the target point.

In order to determine the latitude and longitude of the anomaly 88, it is necessary to know the lateral range or relative distance of the anomaly from the course of the tow fish which lateral range is determined as follows. The length 96 is representative of the distance of the seafloor beneath the tow fish and is measured from the reference line REF along the center of the chart paper 80 to the line 82 representative of the seafloor. Since the echo is returned directly from beneath the tow fish, the distance to the seafloor 96 may be determined by measuring the time it takes for the echo to return and establishing a lateral scale relating inches moved by the stylus to the one way distance travelled by the acoustic wave. For example, a stylus movement of one inch may be representative of an echo returned from a depth of 10 meters. Therefore, the length 96 is converted to distance by multiplying the length times the scale factor. Next, the length 98 is measured from the reference line REF to the base 100 of the anomaly 88. Since the anomaly 88 does not appear at the seafloor 82 directly beneath the tow fish, the length 98 represents the slant range to the anomaly that is, the distance from the tow fish to the anomaly. The lateral distance from the course of the tow fish to the anomaly 88 is determined using well known trigonometric relationships wherein the lateral distance to the anomaly 88 is represented by one leg of a right triangle; the distance to the seafloor is represented by the length 96 and is a second leg of a right triangle, and the slant range to the anomaly is represented by the length 98 and is the hypotenuse of the right triangle. It can be seen from the right triangle representation of the distances as illustrated in FIG. 5a that the lateral distance to the anomaly 88 can be readily calculated. Once the lateral distance to the anomaly 88 is calculated, the latitude and longitude defining the location of the anomaly may be determined taking the tow fish heading into account, that is, the heading deviation angle of the tow fish course.

In addition to determining the latitude and longitude of an identified anomaly it is often desirable to know for purposes of identifying a given object, the relative size or height and width of the object reflecting the acoustic waves and producing the anomaly in the topographic representation. The height of an object is also determined using right triangle relationships wherein the length 102 from the reference line REF is measured to the edge 104 of the acoustic shadow of the anomaly and represents the distance from the tow fish to the top of the object producing the shadow. This distance is represented as the hypotenuse of a right triangle. Another leg of the triangle is represented by the length 96 and is the distance to the seafloor. As illustrated in FIG. 5b, the right triangle relationship shown in FIG. 5a is superimposed on the right triangle relationship shown in FIG. 5b and the height of the object associated with the anomaly is determined using the principal of similar triangles. The length of an object is determined by measuring the length 91 between lines 93 and 95 and multiplying the measured length times the scale factor.

It will readily be seen and appreciated that the manual measurement method of anomaly analysis currently used is time consuming, subject to measurement error and relies on the assumption that the tow fish speed and course is held constant during the mapping of an area of interest. It will also be readily seen that any changes in the relative speed of the tow fish or changes in the course of the tow fish adversely effect the accuracy of an anomaly analysis employing prior art methods.

Figure 6:
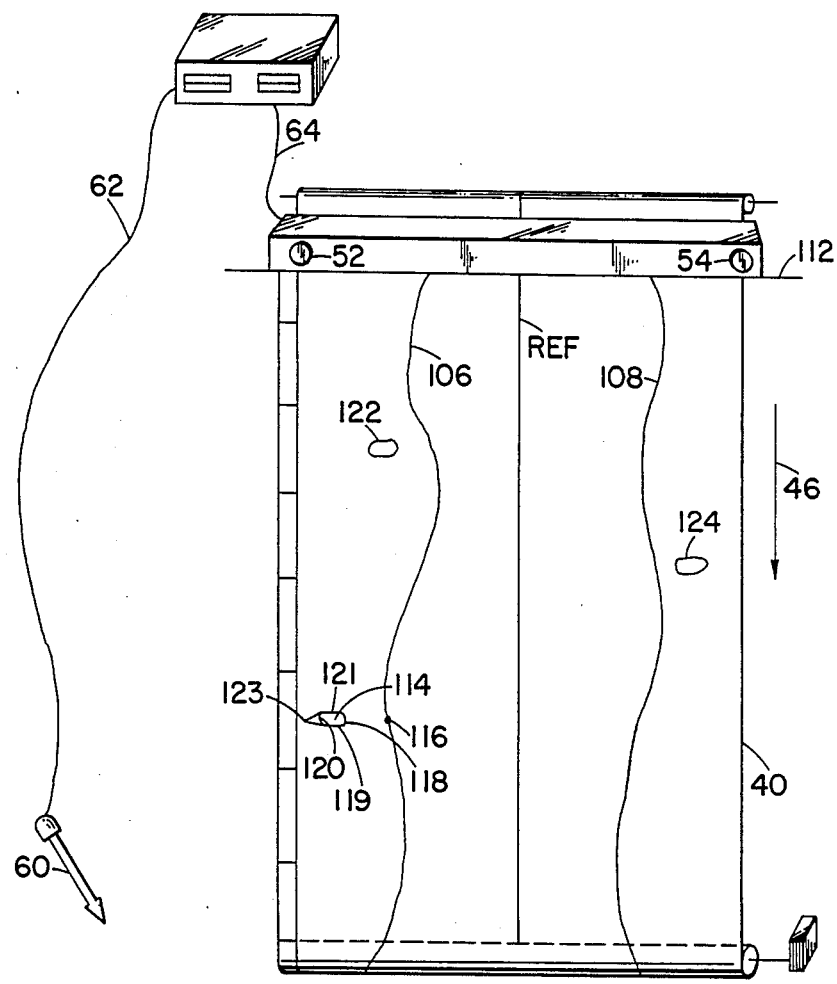
FIG. 6 is a schematic representation of a sonic digitizer positioned at the leading end of a section of a strip chart recording paper as the paper might move past a chart recorder writing stylus wherein a topographic representation including an anomaly to be analyzed on-line and in real time in accordance with the method of the present invention is recorded on the paper.

Referring now to FIGS. 3 and 6, the method of the present invention for performing an anomaly analysis in real time using a sonic digitizer is explained in detail in an illustrative embodiment. The discussion of the method presumes the equipment configuration shown in FIG. 3. FIG. 6 illustrates the controller 66 including a sonic digitizer comprising the two point microphones 52 and 54 and the stylus 60 and chart paper 40 upon which a topographic representation of a seafloor area is recorded wherein the line 106 represents the return echos from the seafloor on the port side of the tow fish and the line 108 represents the return echos from the seafloor on the starboard side of the tow fish.

The method of sonic analysis on-line and in real time of an anomaly appearance in a topographic representation requires that the sonic digitizer be calibrated whereby the position representing the course of the tow fish lies along the reference line REF of the chart paper 40. The calibration is generally made at the time of manufacture and includes mounting the microphones of the sonic digitizer to the chart recorder and transversely to the direction of paper movement and in the region of the writing stylus mechanism 44. After the digitizer microphones 52 and 54 are mechanically mounted to the recorder, the tip of the stylus 60 is touched to the REF line at the writing position 112 and timing and other circuitry associated with the digitizer is adjusted so that the response to sound received at the point microphone sensors 52 and 54 is the same since the sound is emitted an equidistance from each respective microphone 52 and 54. The digitizer establishes the contact point at the intersection of the REF line and writing position 112 as a reference measuring point. The digitizer shifts subsequent sonically digitized points on the chart paper surface in time and space back to the reference writing position 112 as though the point is contacted substantially at the same time it is recorded on the chart paper 40. An algorithm in the instruction set in the controller 66 is used to reference each such point back to the writing stylus position 112. Consequently, the location of any point on the recording surface of the chart paper can be determined as the chart paper 40 moves in a direction indicated by arrow 46 away from the writing stylus position 112 by touching the tip of the sound emitting stylus 60 to the point.

Furthermore, the computer 66 receives information from the tow vessel host computer 68 related to the heading of the tow fish, the speed of the tow fish, and the latitude and longitude of the tow fish for each point sonically digitized so that any variations in speed or changes in the course of the tow fish are automatically taken into account in the computation and determination of the latitude and longitude of an object producing an associated anomaly in the topographic representation of a seafloor. Therefore, the analysis of an anomaly appearing on the chart paper 40 is not required to be performed in the sequence that the anomalies appear on the chart paper since any sonically digitized point on the chart paper surface is always referenced back to the writing stylus position 112 to correct for the movement of the chart paper away from the writing stylus position 112 to the actual position at which contact with the surface is made by the sound emitting stylus 60.

The sonic analysis of an anomaly appearance with the method of the present invention is performed on-line and in real time as follows. During the generation of a topographic representation on chart paper 40, an anomaly appearance, for example, 114 is identified. The tip of the sound emitting stylus 60 is touched to a point 116 laterally opposite the appearance of the anomaly 114 and on the seafloor representation line 106. The controller 66 shifts the contact point in time and space as though contact with the paper surface had been made as the point 116 coincided with the writing stylus position 112 at the time of contact. The controller 66 also senses the stylus tip contact with the surface and substantially simultaneously interrupts the host computer 68 via a signal on lead 70 and receives from the host computer 68 also via lead 70, the speed, heading and position of the tow fish at the time of contact. Lead 70 is representative of a data link between the host computer 68 and the programmed computer 66 and may be for example, a standard RS-232 data link. Next the base 118 and the top 120 of the anomaly appearance 114 and the tip 123 of an acoustic shadow, if present, are contacted with the tip of the stylus 60. The distance between the base 118 and the top 120 is the width of the object producing the anomaly appearance. The distance between the top 120 and the tip 123 of the shadow is the height of the object producing the anomaly appearance. If the length is desired, the edges 119 and 121 are contacted with the tip of the stylus. The controller 66 calculates in accordance with the instruction set using information inputted from the digitizer microphones and stylus and the host computer 68, the latitude and longitude and the height, width and length of an object producing the corresponding anomaly appearance. The analyzed data may be transmitted to the host computer 68 from the controller 66 or the controller may cause the information to be printed on a printer 72, displayed on a graphic display tube or recorded on any other desired recording medium and device coupled to the controller. Alternately, the analyzed data can be printed or displayed by devices coupled to the host computer.

As previously stated, the analysis of an anomaly need not be done in the sequence that the anomalies appear on the chart paper. For example, anomaly 122 appears after anomaly 124 but may be analyzed prior to the analyzation of anomaly 124 as the chart paper 40 moves relative to the writing stylus position 112 in the direction of arrow 46. Consequently, the method of the present invention permits anomaly analysis on-line and in real time as the chart paper moves relative to the writing stylus and as the tow fish moves relative to the seafloor.

Figure 7:
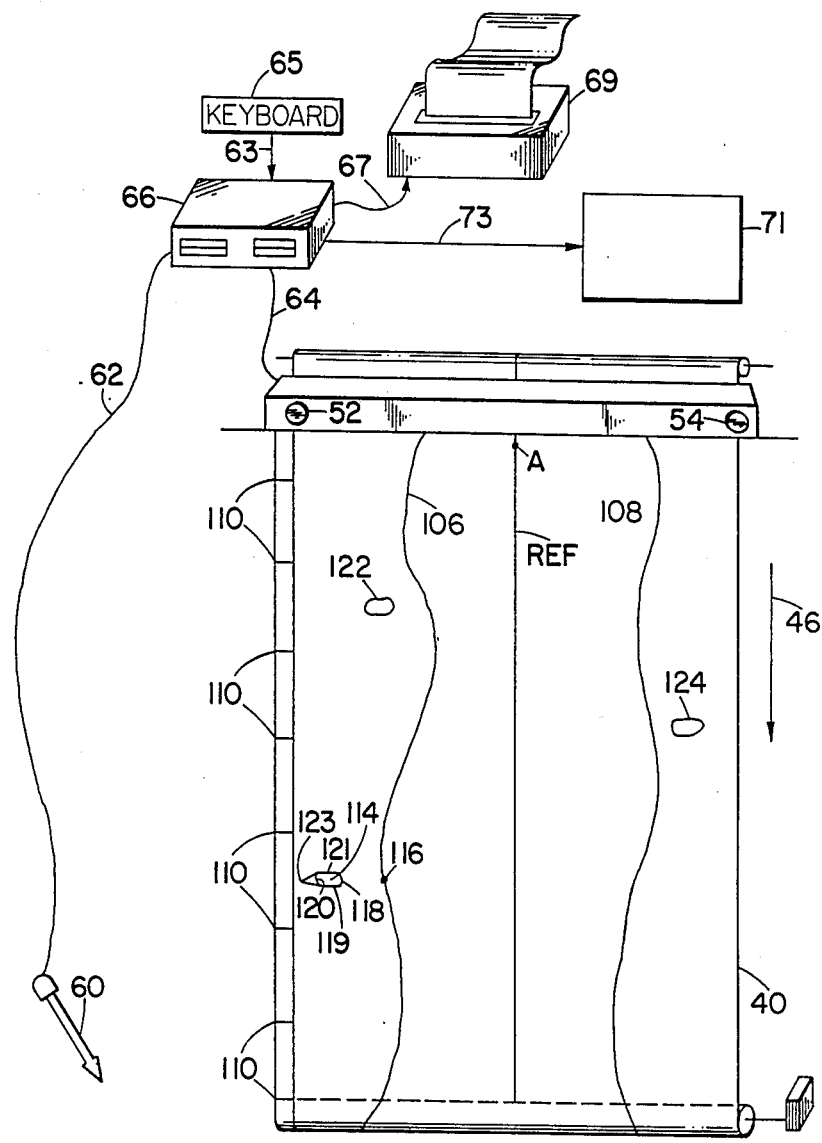
FIG. 7 is a schematic representation of a sonic digitizer positioned transversely to a section of a strip chart recording paper and coupled to a computer for off-line post processing analyzation of an anomaly appearing in the topographic representation.

Considering now the analysis of an anomaly appearance with the method of the present invention performed off-line in a post processing mode, FIG. 7 is a perspective, somewhat schematic view of apparatus required to carry out the method of the invention. For simplicity, many of the numerical references in FIG. 7 are repeated from FIG. 6 wherein like numerical references represent the same element.

In FIG. 7, the controller 66 is coupled by a lead 63 to a keyboard shown functionally at 65, to a printer 69 by a lead 67 and to the sonic stylus by lead 64. In the post processing mode, manual input of the latitude and longitude of fix marks 110,110 are inputted to the controller 66 through the keyboard 65. Since the digitizer microphones are not in a fixed position relative to a chart recorder generating the topographic representation, the sonic digitizer must be calibrated prior to each anomaly analysis. In the post processing mode, the topographic representation is placed relative to the sonic digitizer microphones 52 and 54 so that the digitizer is transverse to the elongated axis of the chart paper, that is, transverse to the direction of paper movement when recorded on the chart recorder.

The method of the present invention is carried out in a post processing mode and comprises the steps of identifying an anomaly on the chart paper for example, a representative anomaly 114; calibrating the digitizer by contacting the tip of the stylus 60 to a calibration point A near the digitizer microphones and on the reference line REF of the topographic representation on chart paper 40; contacting a point 116 opposite the identified anomaly 114 and on the seafloor line 106; contacting with the tip of the stylus 60, the fix mark 110 immediately before the anomaly 114, that is, the fix mark 110 adjacent the anomaly but furthest from the digitizer microphones; inputting the latitude and longitude associated with the fix mark to the controller 66 via the keyboard 65; contacting the fix mark 110 after the anomaly 114, with the tip of the stylus 60, that is, the fix mark 110 adjacent the anomaly but closest to the digitizer microphones; inputting the latitude and longitude associated with the fix mark to the controller 66 via the keyboard 65; contacting the base 118 and the top 120 of the anomaly and the tip 123 of the acoustic shadow, if present, with the tip of the stylus 60. Each of the contact points on the chart paper 40 are transformed in time and space by the controller 66 as explained above. The latitude and longitude, the height and if desired, the length and width of the object causing the anomaly are immediately and accurately computed in accordance with the instruction set in the controller 66. The computed information is outputted on either a printer 69 coupled to the controller 66 via lead 67, a graphic display tube 71 coupled to the controller 66 via lead 73 or an other desired recording medium and associated device.

A method for analyzing on-line and in real time or off-line in a post processing mode the appearance of an anomaly in a topograhic representation of a seafloor utilizing a sonic digitizer and controller has been described. It will be understood that numerous changes ma be had without departing from the spirit and scope of the invention and therefore the invention has been described by way of illustration rather than limitation.

I claim:

1. A method for sonic analyzation of a topographic representation of a seafloor to provide the latitude and longitude of an object producing an anomaly identified in the topographic representation, said method comprising the steps of:
providing means for generating a visual representation of the topographic features of a seafloor in response to acoustic signals transmitted from and sensed by a side scan sonar tow fish coupled to and propelled by a tow vessel traversing a course corresponding to an area of the seafloor that is to be analyzed;
programming a computer with an instruction set to compute the latitude and longitude associated with a given coordinate position on said visual topographic representation;
identifying the appearance of an anomaly on said visual topographic representation;
digitizing the location of said identified anomaly appearance on said visual topographic representation with a sonic digitizer by touching the location of the anomaly appearance with the tip of a stylus associated with the sonic digitizer to provide an associated rectangular coordinate position of said anomaly appearance corresponding to the instant in time said anomaly appearance on said visual topographic representation is touched by said stylus tip;
calculating in accordance with the instruction set the relative rectangular coordinate position of said sonically digitized anomaly appearance with respect to a predetermined reference measuring position associated with said topographic generating means by time and space shifting said digitized coordinate position to said predetermined reference measuring position, and
computing in accordance with the instruction set the latitude and longitude of an object producing the corresponding anomaly appearance on said visual topographic representation.

2. A method for sonic analyzation of a topographic representation of a seafloor as defined in claim 1 further including the steps:
inputting to said computer a geodetic position of said tow fish corresponding to the time said tow fish is located at an associated sonically digitized anomaly appearance;
inputting to said computer a heading of said tow fish corresponding to the time said tow fish is located at said associated sonically digitized anomaly appearance, and
inputting to said computer a speed of said tow fish corresponding to the speed at the time said tow fish is located at said associated sonically digitized anomaly appearance.

3. A method for sonic analyzation of a topographic representation of a seafloor as defined in claim 2 wherein the step of digitizing includes the steps of:
contacting with said sonic stylus tip a point on the topographic representation of a line representative of the seafloor directly beneath the side scan sonar tow fish and laterally opposite the appearance of said anomaly;
contacting with said sonic stylus tip a point on the topographic representation of the anomaly at the base and at the top of said anomaly appearance;
contacting with said sonic stylus tip a point on the topographic representation of the anomaly at the tip of an acoustic shadow associated with said anomaly appearance;
generating a rectangular coordinate for each of the points of contact on said topographic representation made with said sonic stylus tip, and
inputting the generated rectangular coordinates associated with each respective contact point to said computer.

4. A method for sonic analyzation of a topographic representation of a seafloor as defined in claim 3 wherein the step of computing the latitude and longitude associated with an object producing said anomaly further includes the step of continuously correcting for changes in the speed and heading of the tow fish to more accurately determine the location of said object.

5. A method for sonic analyzation of a topographic representation of a seafloor as defined in claim 3 further including the step of determining the height of an object associated with said anomaly.

6. A method for sonic analyzation of a topographic representation of a seafloor as defined in claim 3 further including the step of determining the width of an object associated with said anomaly.

7. A method for sonic analyzation of a topographic representation of a seafloor as defined in claim 3 further including the step of determining the length of an object associated with said anomaly.

8. A method for sonic analyzation of a topographic representation of a seafloor as defined in claim 3 wherein the step of computing the latitude and longitude of an object includes the step of computing in real time the location of said object as the tow fish moving relative to the object and the seafloor, and the appearance of the identified anomaly associated with said object moving relative to said predetermined reference measuring position associated with said topographic generating means.

9. A method for sonic analyzation of a topographic representation of a seafloor as defined in claim 8 further including the steps of:

providing positioning reference signals from at least one positioning system to a host computer associated with a tow vessel for locating at any given instant in time the geodetic position of the tow vessel, and interrogating said host computer at substantially the time said sonic stylus tip is contacted to the topographic representation to obtain a geodetic position, speed and heading of said tow fish corresponding to said anomaly appearance.

10. A method for sonic analyzation of a topographic representation of a seafloor as defined in claim 3 wherein the step of computing the latitude and longitude locating an object further includes the steps of:

computing off-line in post processing the location of said object;

providing indicia on said visual representation for identifying the course of the tow fish;

providing fix mark indicia on said visual representation at spaced apart intervals, each of said fix marks being associated with a latitude and longitude along the course of said tow fish;

providing reference indicia for identifying a beginning latitude and longitude for said tow fish at a point along the course of said tow fish;

correlating the appearance of said beginning latitude and longitude indicia to said predetermined reference measuring position associated with said topographic generating means;

inputting to said computer a latitude and longitude associated with a fix mark appearing before the appearance of said identified anomaly;

inputting to said computer a latitude and longitude associated with a fix mark appearing after the appearance of said identified anomaly;

contacting with said sonic stylus tip a point on the topographic representation at said predetermined reference measuring position and along said indicia identifying said tow fish course;

contacting with said sonic stylus tip a fix mark occurring immediately before the appearance of an anomaly, and contacting with said sonic stylus tip a fix mark occurring immediately after the appearance of an anomaly.

11. A method for sonic analyzation of a topographic representation of a seafloor as defined in claim 1 wherein the step of providing means for generating a visual representation includes the step of providing a strip chart recorder of the type having means for recording said sensed acoustic signals on longitudinally elongated recording paper.

* * * * *